(12) United States Patent
Gansloser et al.

(10) Patent No.: US 12,246,588 B2
(45) Date of Patent: Mar. 11, 2025

(54) ELECTRIC AXLE DRIVE FOR AN AT LEAST PARTIALLY ELECTRIC MOTOR VEHICLE HAVING A SWITCHABLE TORQUE VECTORING OPERATION

(71) Applicant: MERCEDES-BENZ GROUP AG, Stuttgart (DE)

(72) Inventors: Philip Gansloser, Bad Ditzenbach (DE); Tobias Schilder, Ludwigsburg (DE); Tobias Haerter, Stuttgart (DE); Wolfgang Elser, Weil der Stadt (DE); Ernst Walth, Heilbronn (DE); Martin Dengler, Marbach (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/718,957

(22) PCT Filed: Nov. 18, 2022

(86) PCT No.: PCT/EP2022/082484
§ 371 (c)(1),
(2) Date: Jun. 12, 2024

(87) PCT Pub. No.: WO2023/110289
PCT Pub. Date: Jun. 22, 2023

(65) Prior Publication Data
US 2024/0416735 A1 Dec. 19, 2024

(30) Foreign Application Priority Data
Dec. 13, 2021 (DE) ..................... 10 2021 006 124.1

(51) Int. Cl.
*B60K 1/02* (2006.01)
*B60K 17/04* (2006.01)
(Continued)

(52) U.S. Cl.
CPC .............. *B60K 1/02* (2013.01); *B60K 17/046* (2013.01); *B60K 23/04* (2013.01); *B60K 2023/043* (2013.01)

(58) Field of Classification Search
CPC ........ B60K 1/02; B60K 17/046; B60K 23/04; B60K 2023/043
See application file for complete search history.

(56) References Cited

U.S. PATENT DOCUMENTS 7,393,296 B2    7/2008   Kano et al.
9,102,233 B2    8/2015   Knoblauch et al.
(Continued)

FOREIGN PATENT DOCUMENTS

CN    113022227 A  *  6/2021    ........... B60B 35/125
CN    113173065 A  *  7/2021    ............... B60K 1/02
(Continued)

OTHER PUBLICATIONS

International Search Report and Written Opinion mailed Feb. 16, 2023 in related/corresponding International Application No. PCT/EP2022/082484.

(Continued)

*Primary Examiner* — Tinh Dang
(74) *Attorney, Agent, or Firm* — PATENT PORTFOLIO BUILDERS PLLC

(57) ABSTRACT

An electric axle drive for a motor vehicle includes a first electric engine, which has a first rotor, a second electric engine, which has a second rotor, and a differential transmission with three shafts. The first rotor can be coupled with the input shaft such that torques originating from the first rotor are introduced into the differential transmission via the input shaft. A first switch element is configured to couple the second rotor with the first output shaft such that torques originating from the second rotor are introduced into the first (Continued)

output shaft. A second switch element is configured to couple the second rotor with the second output shaft such that torques originating from the second rotor are introduced into the second output shaft.

8 Claims, 1 Drawing Sheet

(51) Int. Cl.
  *B60K 23/04* (2006.01)
  *F16H 48/11* (2012.01)
  *F16H 48/36* (2012.01)

(56) References Cited

U.S. PATENT DOCUMENTS

| | | |
|---|---|---|
| 10,113,630 B2 | 10/2018 | Cooper |
| 11,131,374 B2 | 9/2021 | Cooper et al. |
| 11,760,179 B2 | 9/2023 | Glückler et al. |

FOREIGN PATENT DOCUMENTS

| | | | |
|---|---|---|---|
| DE | 102010005789 A1 | 7/2011 | |
| DE | 102010051058 A1 | 5/2012 | |
| DE | 102012101209 A1 | 8/2013 | |
| DE | 112017006087 T5 | 8/2019 | |
| DE | 102019202208 A1 * | 8/2020 | ........... B60K 17/046 |
| DE | 102019206957 A1 | 11/2020 | |
| DE | 102019115918 A1 | 12/2020 | |
| DE | 102021101674 A1 | 7/2022 | |
| JP | H11170881 A | 6/1999 | |
| JP | 2007232193 A | 9/2007 | |
| WO | WO-2019109899 A1 * | 6/2019 | ............... B60K 1/02 |

OTHER PUBLICATIONS

Office Action created Sep. 20, 2022 in related/corresponding DE Application No. 10 2021 006 124.1.

* cited by examiner

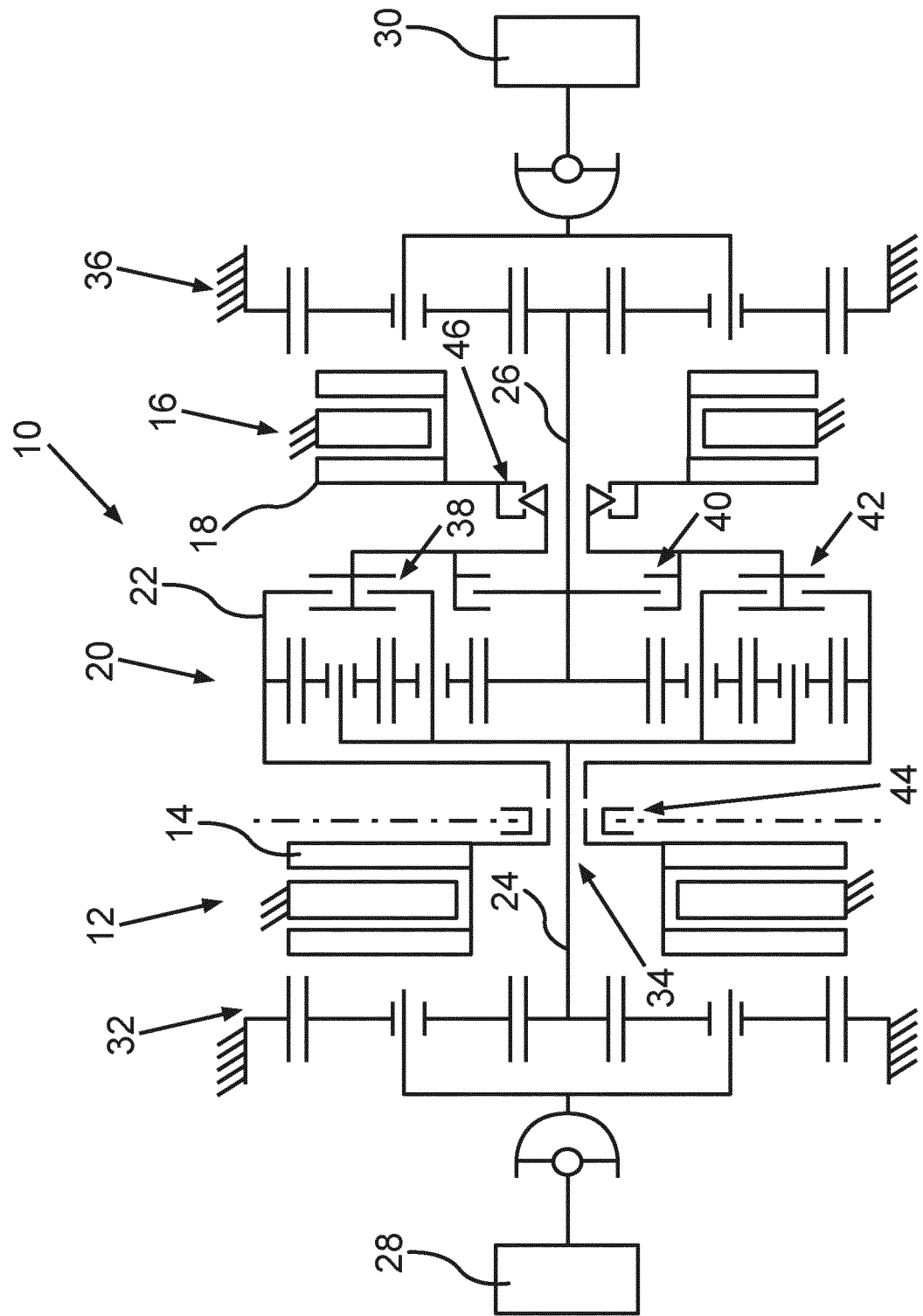

ELECTRIC AXLE DRIVE FOR AN AT LEAST PARTIALLY ELECTRIC MOTOR VEHICLE HAVING A SWITCHABLE TORQUE VECTORING OPERATION

BACKGROUND AND SUMMARY OF THE INVENTION

Exemplary embodiments of the invention relate to an electric axle drive for an at least partially electric motor vehicle.

At least partially electric motor vehicles or fully electric motor vehicles that have two electric engines to drive the wheels are already known from the prior art. This enables the two electric engines respectively to be driven in the torque vectoring operation only. Single operation is not possible. A single electric engine is respectively assigned to each wheel side, meaning that single operation is not possible. For identical torque capacities at both wheels, only symmetrical arrangements, in particular identical electric engines, are logical. The maximum wheel torque is limited to the maximum moment of the respectively assigned electric engine.

Drives having differentials are further known, which in principle offer both single operation of the electric engines and torque vectoring functionality. A mode switch from single operation to torque vectoring operation without interrupting traction is only possible with high-torque friction couplings on the wheel and differential side. An implementation with purely form-fit switch elements, for example claws, can only be implemented with complete traction interruption. Identical torque capacities at both wheels are only logical in symmetrical arrangements. The maximum wheel torque is here also limited to the maximum moment of the respectively assigned electric engine.

Engine arrangements having a differential and superposition gearbox for torque vectoring operation are furthermore known, which vary the torque vectoring moment with little effort, but have the disadvantage that the torque distribution is asymmetrical on the one hand, and on the other hand reduces the total operating torque in a torque direction. In addition, a great deal of complexity and effort is required for the superposition gearbox, and optionally an additional gear reduction level.

DE 10 2010 051 058 A1 relates to a drive unit having a first drive, a second drive, and at least one planetary transfer transmission, wherein the planetary transfer transmission has at least two drivable shafts and two drive shafts, of which at least one drivable shaft is a coupling member between a planetary transmission that can be driven by one of the drives and the planetary transfer transmission formed from at least a sun, a planetary carrier and two sets of planets.

Systems respectively having an electric engine and the possibility of a torque vectoring operation for an axle drive are known from DE 10 2021 101 674 A1, DE 11 2017 006 087 T5, DE 10 2019 115 918 A1 and U.S. Pat. No. 10,113,630 B2.

Electric axle drives, respectively having two electric engines and the possibility of a switchable torque vectoring operation are known from U.S. Pat. No. 7,393,296 B2, and from the generic DE 10 2012 101 209 A1.

Exemplary embodiments of the present invention are directed to an electric axle drive, by means of which different electric engines and gearwheel sets can be installed in the motor vehicle, wherein a switchable torque vectoring operation should be implemented particularly compactly.

One aspect of the invention relates to an electric axle drive for an at least partially electric motor vehicle having at least one first electric engine, which has a first rotor, and having a second electric engine, which has a second rotor. The electric axle drive further has a differential transmission, having an input shaft, a first output shaft, and a second output shaft, wherein the output shafts are designed to discharge torques from the differential transmission in the direction of motor vehicle wheels, wherein the first rotor can be coupled with the input shaft such that torques from the first rotor are introduced into the differential transmission via the input shaft. The differential transmission preferably has exactly three shafts, specifically the input shaft, the first output shaft and the second output shaft.

A first switch element, by means of which the second rotor can be coupled with the first output shaft such that torques originating from the second rotor are introduced into the first output shaft while bypassing the input shaft and while bypassing the second output shaft, is provided in a manner known per se. A second switch element is additionally provided, also in a manner known per se, by means of which the second rotor can be coupled with the second output shaft such that torques originating from the second rotor are introduced into the second output shaft while bypassing the input shaft and while bypassing the first output shaft.

An electric axle drive with two electric engines can thus, in particular, be provided, which enables the functional options of a single operation, a torque vectoring operation and individually configurable electric engines and transmission ratios. In particular, the torque vectoring operation can be switched, and the transmission ratios can be designed asymmetrically. With one of the electric engines as the main electric engine and transmission, the basic torque requirement is distributed to both motor vehicle wheels via a differential, and thus a so-called single electric engine operation or single operation is provided. For example, the first electric engine can be regarded as the main electric engine. Via the second electric engine, an additional torque requirement can either be additively passed to a particular motor vehicle wheel via the torque vectoring operation or introduced to the differential input as a "boost" torque in the dual operation of the electric engines, and from there be evenly distributed to the two motor vehicle wheels.

The torque vectoring operation should generally be understood to mean that the electric axle drive is operated such that the two output shafts of the differential transmission, specifically the first output shaft and the second output shaft, transmit torques set differently to the motor vehicle wheel respectively connected to them.

In particular, it can be provided that the second electric engine is also arranged coaxially to the differential transmission.

According to this concept, by using the differential transmission, for example in a planetary design, any additional torque, in particular a drive or braking torque, of the second electric engine can be applied to both output shafts of the differential transmission even in the coaxial design, which is here described as a torque vectoring operation. As an alternative, a boost operation is possible, which can also be described as a dual electric engine operation, in which the two electric engines introduce their torques at the input shaft of the differential transmission, and in which these torques are then equally distributed to the two output shafts of the differential transmission, and thus to the two motor vehicle wheels. In the reduced consumption single-electric engine operation, which can also be described as eco mode, the second electric engine can be completely switched off, and, for example also decoupled, such that it does not have to be entrained.

In particular, this has the advantage that the two electric engines and gearwheel sets can be sized individually and in a modular manner depending on design, power requirement, efficiency, and functionality. A necessarily symmetrical sizing of the two electric engines is not required in this case. A space-saving coaxial structure, and thus usable installation space for integrating power electronics and transmission control into the overall unit can further be realized. The switch between the operating modes torque vectoring, single and dual drive without traction interruption can further also be implemented with simple form-fit and drag torque-free switch elements, for example claws, because the basic torque of the main electric engine is always available. Further, it is also possible to change gears in gearwheel sets having form-fit switch elements optionally designed to be multi-geared in structure, because the traction can always be supported by the respective non-switching partial drive train.

In the torque vectoring operation, in addition to the basic torque from the main engine, the entire torque of the second electric engine can be additively passed to one wheel side. The maximum wheel torque is not limited to the maximum torque of the respectively assigned electric engine, as in a symmetrical concept.

In particular, a simple, modular, dual-electric engine concept is thus enabled, having the functional elements torque vectoring, single EE mode, dual drive, disconnect and differential block. A maximum switching flexibility and differential block functionality using friction couplings instead of form-fit switch elements can thus be implemented. Optionally, the controlled selection of the torque vectoring wheel side can be implemented by means of two opposite effective freewheels in combination with a positive and negative transmission gearwheel set via the direction of rotation of the second electric engine.

According to the invention, it is provided that the first electric engine and the differential transmission are arranged coaxially to each other and coaxially to a main axis of rotation of the electric axle drive.

According to the invention, it is further provided that, relative to the main axis of rotation, the first switch element is arranged axially overlapping and radially surrounding the second switch element. A compact electric axle drive which takes up less installation space can thus be provided.

Two components being arranged axially overlapping means that at least parts of the two components are respectively arranged in the same axial region. The term "axial" relates in this case to the main axis of rotation. The two components are respectively at least partially arranged in the same axial region, if they at least partially have identical location coordinates with regard to a coordinate axis that is arranged in parallel with the main axis of rotation.

A first component being arranged radially surrounding a second component means that the first component is arranged in a region of larger radii in relation to the main axis of rotation than the second component.

According to an advantageous development, a third switch element is provided, by means of which the second rotor can be coupled with the input shaft such that torques originating from the second rotor are introduced into the differential transmission via the input shaft, wherein relative to the main axis of rotation, the third switch element is arranged radially surrounding and axially overlapping the first switch element. It is thus possible that the electric axle drive can be operated in different modes, such that a torque vectoring operation, a single EE operation, and a dual EE operation can be implemented.

A differential blocking method is advantageously possible, in which the differential transmission can be blocked by closing two of the three switch elements, for example the first switch element, the second switch element, or the third switch element.

According to an advantageous embodiment, the first switch element and the second switch element are respectively designed as a friction coupling. In particular, it is thus possible to switch easily between the respective modes.

It has further proved advantageous if the first switch element and the second switch element are arranged axially between the differential transmission and the second electric engine. The electric axle drive can thus be implemented such that it saves installation space.

A fourth switch element is further advantageously provided, which is designed to connect the first rotor to the input shaft for concomitant rotation. It is thus made possible for the torque of the first electric engine to be transferred to the input shaft reliably and as required.

A connection for concomitant rotation of two rotatably mounted elements should be understood to mean that the two rotatably mounted elements are arranged coaxially to each other, and are connected to each other such that they rotate at the same angular velocity.

In the further advantageous embodiment, a fifth switch element is provided, which is designed to connect the second rotor to the input side of the first switch element for concomitant rotation and as required. It is thus made possible for the second electric engine to be able to transfer torque reliably and as required.

According to a further advantageous embodiment, a first planetary gear set is provided, which is arranged between the first output shaft and a first motor vehicle wheel of the motor vehicle wheels in relation to a torque flow, and a second planetary gear set can be provided, which is arranged between the second output shaft and a second motor vehicle wheel of the motor vehicle wheels in relation to a torque flow. As an alternative, the first planetary gear set or the second planetary gear set can also be arranged between the first rotor and the input shaft, and the second planetary gear set can for example alternatively also be arranged between the second rotor and the first switch element. Another further planetary gear set can also be designed to be multi-geared.

It is also advantageous if the differential transmission has a sun gear, a double planetary carrier, and an annular gear, wherein the annular gear is connected to the input shaft for concomitant rotation, the double planetary carrier is connected to the first output shaft for concomitant rotation and the sun gear is connected to the second output shaft for concomitant rotation. It is thus made possible for the torque of the first electric engine and/or second electric engine to be reliably transferred to the input shaft In a further advantageous embodiment, in relation to the direction of the main axis of rotation, the first output shaft, the sun gear, the first switch element, and the second electric engine are arranged one after the other in the specified order. A more compact electric axle drive can thus be implemented.

A further aspect of the invention relates to a motor vehicle having an electric axle drive according to the preceding aspect. The motor vehicle is in particular operated at least partially electrically, or fully electrically.

Advantageous embodiments of the electric axle drive should be seen as advantageous embodiments of the motor vehicle.

Further advantages, features and details of the invention result from the following description of a preferred exemplary embodiment and with reference to the drawing.

BRIEF DESCRIPTION OF THE SOLE FIGURE

The sole FIGURE shows a schematic view of an embodiment of an electric axle drive.

In the FIGURE, identical or functionally identical elements are provided with identical reference numerals.

DETAILED DESCRIPTION

The sole FIGURE shows, in a schematic perspective view, an embodiment of an electric axle drive 10 for an at least partially electric motor vehicle (not depicted). The motor vehicle can also be fully electric. The electric axle drive 10 has a first electric engine 12 having a first rotor 14. The first electric engine 12 is advantageously designed as an axial flux machine. The electric axle drive 10 further has a second electric engine 16 having a second rotor 18. The second electric engine 16 is advantageously also of the axial flux machine type. The electric axle drive 10 further has a differential transmission 20 having exactly three shafts, specifically an input shaft 22, a first output shaft 24, and a second output shaft 26, wherein the output shafts 24, 26 are designed to discharge torques from the differential transmission 20 in the direction of motor vehicle wheels 28, 30, wherein the first rotor 14 can be coupled with the input shaft 22 such that torques originating from the first rotor 14 are introduced into the differential transmission 20 via the input shaft 22, wherein the first electric engine 12 and the differential transmission 20 are arranged coaxially to each other and coaxially to a main axis of rotation 34, in particular of the electric axle drive 10.

The electric axle drive 10 further has a first switch element 38, by means of which the second rotor 18 can be coupled with the first output shaft 24 such that torques originating from the second rotor 18 are introduced into the first output shaft 24 while bypassing the input shaft 22 and while bypassing the second output shaft 26. A second switch element 40 is further provided, by means of which the second rotor 18 can be coupled with the second output shaft such that torques originating from the second rotor 18 are introduced into the first second shaft 26 while bypassing the input shaft 22 and while bypassing the first output shaft 24. By means of the first switch element 38, and by means of the second switch element 40, a torque vectoring operation can thus be implemented by deliberately supplying a different torque to the first output shaft 24 than to the second output shaft 26.

In particular, it is thus made possible to size the two electric engines 12, 16 and the respective gearwheel sets individually and in a modular manner depending on design, power requirement, efficiency, and functionality. A necessarily symmetrical design is not required in this case. The space-saving coaxial structure and the thus usable installation space for integrating power electronics and transmission control into the overall unit is made possible. The switch between the operating modes torque vectoring/single drive/dual drive without traction interruption can further also be implemented with simple form-fit and drag torque-free switch elements, for example claws, because the basic torque of the first electric engine 12 in the preceding exemplary embodiment as the main electric engine is always available. Furthermore, it is also possible to change gears in gearwheel sets having form-fit switch elements and optionally designed to be multi-geared, because the traction can be supported by the respective non-switching partial drive train. In the torque vectoring operation, in addition to the basic torque from the main engine, the entire torque of the second electric engine 16 can be additively passed to one wheel side. The maximum single wheel torque is not limited to the maximum torque of the respectively assigned electric engine in symmetrical concepts.

Further, it is, in particular, provided that at least the first switch element 38 and the second switch element 40 are respectively designed as a friction coupling. As an alternative, a claw coupling can also be proposed, wherein a multi-disc coupling is in particular required for the torque vectoring to be able to be powershifted.

The first switch element 38 and the second switch element 40 can further be arranged between the differential transmission 20 and the second electric engine 16 relative to the main axis of rotation 34. It can further be provided that, relative to the main axis of rotation 34, the first switch element 38 is arranged axially overlapping and radially surrounding the second switch element 40.

A third switch element 42 can further be provided, by means of which the rotor 18 can be coupled with the input shaft 22 such that torques originating from the second rotor 18 are introduced into the differential transmission 20 via the input shaft 22, wherein relative to the main axis of rotation 34, the third switch element 42 is arranged radially surrounding and axially overlapping the first switch element 38.

By means of the first switch element 38, the second switch element 40 and the third switch element 42, the second electric engine 16 can further be completely decoupled from the differential transmission 20, whereby a disconnect operation can be implemented for the second electric engine 16.

A fourth switch element 44 can further also be provided, which is designed to connect the first rotor 14 to the input shaft 22 for concomitant rotation. A fifth switch element 46 can also be provided, which is designed to connect the second rotor 18 to the input side of the first switch element 38 for concomitant rotation. The fifth switch element 46 is advantageously designed as a freewheel, such that the freewheel then establishes a connection of the second rotor 18 to the input side of the first switch element 38 for concomitant rotation if the second rotor 18 rotates more quickly than the input side of the first switch element 38 or if the second rotor 18 shifts the input side of the first switch element 38.

As an alternative, instead of the fifth switch element 46, there is a permanent connection between the second rotor 18 and the input side of the first switch element 38 for concomitant rotation. In the case of this alternative of the connection of the second rotor 18 and the input side of the first switch element 38 for concomitant rotation, the second electric engine can be used to brake the first output shaft or the second output shaft for the purpose of the torque vectoring operation.

By means of the fourth switch element 44, a disconnect operation can be implemented for the first electric engine 2, wherein the first electric engine 2 is completely decoupled from the differential transmission 20.

A disconnect operation can advantageously also be implemented in a manner not depicted in the sole FIGURE, by installing further switch elements respectively assigned to planetary gear sets 32, 36, specifically to a first planetary gear set 32 and a second planetary gear set 36, by means of which switch elements the motor vehicle wheels 28, 30 can be decoupled from the planetary gear sets 32, 36, or by means of which the output shafts 24, 26 can be decoupled from the planetary gear sets 32, 36, or by means of which annular gears of the planetary gear sets 32, 36 can respectively be decoupled from the housing.

The differential transmission 20 can be blocked, in which two of three shafts, specifically the input shaft 22, the first output shaft 24 and the second output shaft 26 can be connected to each other for concomitant rotation.

The differential transmission 20 can be blocked by closing at least two of the three switch elements, specifically the first switch element 38, the second switch element 40 and the third switch element 42, such that the differential transmission 20 is blocked. Specifically, by respectively designing at least two of these three specified switch elements as friction couplings, in particular as multi-disc couplings, a differential blocking operation can be implemented with slight slip, which is necessary, or at least very advantageous for passenger car applications.

In particular, it can further be provided that the first planetary gear set 32 is arranged between the first output shaft 24 and on the first motor vehicle wheel 28 of the motor vehicle wheels 28, 30 in relation to a torque flow, and that the second planetary gear set 36 is arranged between the second output shaft 26 and the second motor vehicle wheel 30 of the motor vehicle wheels 28, 30 in relation to a torque flow.

The sole FIGURE further shows that the differential transmission 20 can have a sun gear, a double planetary carrier, and an annular gear, wherein the annular gear is connected to the input shaft 22 for concomitant rotation, the double planetary carrier is connected to the first output shaft 24 for concomitant rotation, and the sun gear is connected to the second output shaft 26 for concomitant rotation. In relation to the direction of the main axis of rotation 34, the first output shaft 24, the sun gear, the first switch element 38 and the second electric engine 16 are advantageously arranged one after the other in the specified order.

In relation to the main axis of rotation 34 of the first planetary gear set 32, the first electric engine 12, the differential transmission 20, the first switch element 38, the second electric engine 16, and the second planetary gear set 36 are advantageously arranged one after the other in the specified order.

Overall, the FIGURE shows a coaxial dual-E-engine concept with eATS with additive torque vectoring.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

10 electric axle drive
12 first electric engine
14 first rotor
16 second electric engine
18 second rotor
20 differential transmission
22 input shaft
24 first output shaft
26 second output shaft
28 first motor vehicle wheel
30 second motor vehicle wheel
32 first planetary gear set
34 main axis of rotation
36 second planetary gear set
38 first switch element
40 second switch element
42 third switch element
44 fourth switch element
46 fifth switch element

The invention claimed is:

1. An electric axle drive for an at least partially electric motor vehicle, the electric axle drive comprising:
a first electric engine having a first rotor;
a second electric engine having a second rotor;
a differential transmission comprising an input shaft, a first output shaft, and a second output shaft, wherein the first and second output shafts are configured to discharge torques from the differential transmission in a direction of motor vehicle wheels, wherein the first rotor is couplable with the input shaft such that torques originating from the first rotor are introduced into the differential transmission via the input shaft;
a first switch element configured to couple the second rotor with the first output shaft such that torques originating from the second rotor are introduced into the first output shaft while bypassing the input shaft and while bypassing the second output shaft; and
a second switch element configured to couple the second rotor with the second output shaft such that torques originating from the second rotor are introduced into the second output shaft while bypassing the input shaft and while bypassing the first output shaft;
a first planetary gear set arranged between the first output shaft and a first motor vehicle wheel of the motor vehicle wheels in relation to a torque flow; and
a second planetary gear set arranged between the second output shaft and a second motor vehicle wheel of the motor vehicle wheels in relation to the torque flow,
wherein the first electric engine and the differential transmission are arranged coaxially to each other and coaxially to a main axis of rotation,
wherein in relation to the main axis of rotation, the first switch element is arranged axially overlapping and radially surrounding the second switch element.

2. The electric axle drive of claim 1, further comprising:
a third switch element configured to couple the second rotor with the input shaft such that torques originating from the second rotor are introduced into the differential transmission via the input shaft, wherein in relation to the main axis of rotation, the third switch element is arranged radially surrounding and axially overlapping the first switch element.

3. The electric axle drive of claim 1, wherein the first switch element and the second switch element are friction couplings.

4. The electric axle drive of claim 1, wherein in relation to the main axis of rotation, the first switch element and the second switch element are arranged axially between the differential transmission and the second electric engine.

5. The electric axle drive of claim 2, further comprising:
a fourth switch element configured to connect the first rotor to the input shaft to concomitantly rotate.

6. The electric axle drive of claim 5, further comprising:
a fifth switch element configured to connect the second rotor to an input side of the first switch element to concomitantly rotate.

7. The electric axle drive of claim 1, wherein the differential transmission has a sun gear, a double planetary carrier, and an annular gear, wherein the annular gear is connected to the input shaft to concomitantly rotate, the double planetary carrier is connected to the first output shaft to concomitantly rotate, and the sun gear is connected to the second output shaft to concomitantly rotate.

8. The electric axle drive of claim 7, wherein in relation to a direction of the main axis of rotation, the first output shaft, the sun gear, the first switch element, and the second electric engine are arranged one after the other in the recited order.

* * * * *